United States Patent [19]

Bogan et al.

[11] 4,100,045

[45] Jul. 11, 1978

[54] RADIATION CURABLE EPOXY COATING COMPOSITION OF DIMER ACID MODIFIED VINYL ESTER RESIN

[75] Inventors: Gary W. Bogan; Richard A. Hickner, both of Lake Jackson, Tex.

[73] Assignee: The Dow Chemical Company, Midland, Mich.

[21] Appl. No.: 644,693

[22] Filed: Dec. 29, 1975

[51] Int. Cl.² .................. C08F 8/00; C08L 63/00
[52] U.S. Cl. ...................... 204/159.16; 204/159.15; 204/159.19; 204/159.23; 260/23 EP; 260/23 CP; 260/23 AR; 260/836; 260/837 R; 427/54; 428/413; 428/418; 428/511

[58] Field of Search .............. 260/23 EP, 836, 837 R; 204/159.23, 159.19, 159.16

[56] References Cited

U.S. PATENT DOCUMENTS

| | | | |
|---|---|---|---|
| 3,256,226 | 6/1966 | Fekete et al. | 260/23.5 |
| 3,367,992 | 2/1968 | Bearden | 260/837 |
| 3,674,545 | 7/1972 | Strolle | 260/23 EP |

Primary Examiner—Richard B. Turer

[57] ABSTRACT

A radiation curable vehicle for coating and printing ink compositions consist essentially of the reaction product of a polyepoxide, a saturated dicarboxylic acid, an ethylenically unsaturated monocarboxylic acid and optionally a saturated monocarboxylic acid.

13 Claims, No Drawings

RADIATION CURABLE EPOXY COATING COMPOSITION OF DIMER ACID MODIFIED VINYL ESTER RESIN

BACKGROUND OF THE INVENTION

The present invention relates to coating compositions such as printing inks curable by actinic radiation. Such printing inks and coatings are known. The prior known systems have many advantages over the known heat curable systems. However, those prior radiation curable systems have still had so many disadvantages as to preclude their ready commercial acceptance. A suitable vehicle should be low in toxicity while maintaining good lithographic properties, such as, for example, good pigment wetting, low viscosity and fast curability.

The Prior Art

In U.S. Pat. No. 3,256,226 there is described a resinous product derived from reacting 2 equivalents of a polyepoxide, 1.0 to 1.8 equivalents of a dicarboxylic acid and 0.2 to 1.0 equivalents of an unsaturated monobasic acid. The resinous products are of impractically high viscosity for use in an ink formulation.

U.S. Pat. No. 2,826,562 teaches the reaction of a polyepoxide with an ethylenic half ester of a dicarboxylic acid and a dicarboxylic acid with the product useful as a laminating resin.

It is taught in U.S. Pat. No. 2,824,851 that a minor amount of a dicarboxylic acid may be included in the reaction of a polyepoxide and acrylic acid to provide a hard solid product.

U.S. Pat. Nos. 3,673,140 and 3,713,864 relate to printing ink vehicles from the acrylates of the diglycidyl ethers of bisphenols.

U.S. Pat. Nos. 3,804,735; 3,856,744 and 3,847,770 teach the inclusion of saturated fatty monoacids in the reaction of acrylic acid and diglycidyl ethers of bisphenols.

SUMMARY OF THE INVENTION

The present invention is concerned with a radiation curable resinous composition consisting essentially of the reaction product of a polyepoxide, a saturated dicarboxylic acid, an ethylenically unsaturated monocarboxylic acid and optionally a small amount of a saturated monocarboxylic acid as a partial replacement of the unsaturated monocarboxylic acid. The compositions are particularly well adapted for use as a vehicle in radiation curable printing inks and coatings.

The useful saturated dicarboxylic acids are those of relatively high molecular weight therein, for example, the carboxyl groups are separated by from about 20 to about 36 carbon atoms. Typical of such diacids include the various dimerized acids such as that sold commercially as a $C_{36}$ diacid as Empol 1022. Such dimerized fatty acids typically contain varying amounts of trimerized or 54 carbon acid. Thus, for example, Empol 1022 contains 75% dimer acid, 22% trimer acid, and 3% unreacted fatty acid. The diacid should be free of groups other than carboxyl that are reactive with an oxirane ring.

The composition also includes an alpha-beta ethylenically unsaturated monocarboxylic acid. Suitable acids include acrylic, methacrylic, crotonic, cinnamic and the like.

As another unsaturated carboxylic acid, it is possible to use a half ester formed by reaction of one mole of a hydroxyalkyl acrylate with a cyclic anhydride. Suitable hydroxyalkyl acrylates include the mono acrylic esters of polyethylene or polypropylene glycols having average molecular weights up to about 400 and preferably up to about 200. Representative cyclic anhydrides include maleic anhydride, phthalic anhydride, dodecenylsuccinic anhydride, tetrachlorophthalic anhydride and the like.

A saturated monocarboxylic acid may also be used in partial replacement of the unsaturated monoacid. Advantageously such saturated acids will contain from about 9 to about 18 carbon atoms. Typical of those acids are pelargonic acid, undecylic acid, lauric acid, myristic acid, palmitic acid and stearic acid. Such acids are frequently present in mixtures of the acids and those mixtures may also be employed.

Any of the known polyepoxides can be employed in the preparation of the vinyl ester resins of this invention. Useful polyepoxides are glycidyl polyethers of both polyhydric alcohols and polyhydric phenols, epoxy novolacs or mixtures thereof.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups.

Where polyhydric phenols are selected to prepare the polyepoxide, many structural embodiments are possible. Polyepoxides prepared from polyhydric pheols may contain the structural group

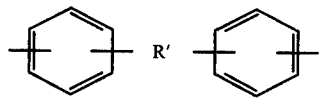

wherein R' is a divalent hydrocarbon radical such as

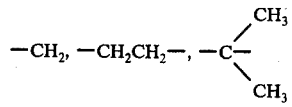

and the like
or R' is

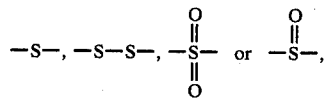

or 0.

The choice of novolac resins leads to a separate, well recognized class of epoxy novolac resins. Other modifications are well known to those skilled in the art.

Further, it is well recognized that flame retardancy properties can be obtained by the introduction of phosphorus and halogen into the epoxy resin itself or by the selection of fillers, extenders, curing agents and the like which contribute to the flame retardant properties. For example, high levels of bromine can be introduced into the resin by the use of tetrabromo bisphenol A.

While the invention is applicable to polyepoxides generally, a most advantageous class of polyepoxides are those glycidyl polyethers of polyhydric alcohols or polyhydric phenols having weights per epoxide group of 150 to 2000 (i.e. epoxy equivalent weight). These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

A preferred class of polyepoxides are those derived from a methylene bisphenol or a 2,2'-isopropylidene bisphenol.

The above reactants are incorporated in the compositions to provide essentially a stoichiometric equivalency of carboxyl function with the oxirane groups present. By that is meant that there are from about 0.8 to about 1.15 equivalents of carboxylic acid ingredients for each equivalent of polyepoxide and preferably 0.9 to about 1.05 equivalents of carboxylic acid. Within that limitation it is preferred that the diacid be in the range of 0.1 to 0.3 equivalent, the unsaturated monoacid from 0.5 to 0.9 equivalent and the saturated monoacid from 0 to 0.3 equivalent in each instance compared to 1.0 equivalent of epoxide.

Because of the presence of reactive ethylenically unsaturated groups in the reaction mixture, it is essential to maintain an inventory of a suitable vinyl-polymerization inhibitor in the reaction mixture and also in the product composition. Any of the hydroquinones and quinones have been found to be suitable for this purpose, although it is generally preferred to employ the quinones since the hydroquinones tend to enter into reaction with epoxy groups of the starting materials. Toluquinone and toluhydroquinones are preferred inhibitors since the reaction products appear to be clearer when toluquinone or toluhydroquinone is employed as the inhibitor. Other successful inhibitors include p-quinone, 2,5-dimethyl-p-benzoquinone, 1,4-naphthaquinone, anthraquinone, chloranil.

The composition is used to prepare a radiation curable product by mixing the mentioned ingredients and reacting the mixture at from about 80° to 120° C under catalytic inducement. The reaction is independent of the order of adding the ingredients to each other. If temperature lower than about 80° C are used the reaction is too slow to be practical. If reaction temperature exceeds about 120° C, side reactions are promoted decreasing the yield of the desired product and the possibility of a difficulty controllable exotherm is presented.

The esterification reaction is preferably catalyzed with known catalysts for the esterification of carboxyl groups with oxirane groups. Such catalysts include tertiary amines, such as tris(dimethylaminoethyl)phenol, and also include chromium salts.

By using the stated reaction conditions it is possible to achieve quantitative yields of the desired products having a major portion of the molecules with unsaturated terminal groups. That product is a liquid of a viscosity high enough to be useful in inks and similar coating compositions but which is of lower viscosity when compared to existing polyesters tailored for such applications. The products also have lower toxicity, faster cure speeds and improved lithographic properties when so compared.

The compositions are polymerizable by exposure to light particularly ultraviolet radiation. For that purpose the compositions contain an ultraviolet light sensitizer. Sensitizers which are useful in this regard include, for example, acetophenone, benzophenone, Michler's ketone, 2-chlorothioxanthane or mixtures thereof.

The amount of sensitizer will usually be in the range between about 0.5 to about 20 weight percent of the composition, preferably 5 to 10 weight percent.

The sensitizers are commonly added to the composition by known means. The sensitizer may be melted and then poured into and mixed with the composition. Alternatively the sensitizer and composition may be mixed on a conventional three roll mill.

The compositions are useful as clear coatings on a variety of substrates or may be colored using conventional colorants including both pigments and dyes. The compositions are especially well suited as a vehicle for photopolymerizable printing inks employing colorants known for such materials. The colorant should not react with or inhibit the polymerization of the composition.

A colorant, when used, will be in the amount needed to achieve the desired shady hue or other effect. With printing inks that amount will usually be in the range of from about 1 to about 60 weight percent of the composition.

Other conventional additives commonly employed in coating compositions for particular effects may also be included. Thus ingredients such as waxes may be used to increase resistance to blocking. Other additives, such as known thermosetting resins, as for example, phenolic resins, may be included to modify the coating properties of gloss, hardness, and rub and scratch resistance.

Nonpolymerizable solvents may be incorporated in minor amount in the coating formulation to adjust the rheological properties of the formulation. Such solvents are generally not desired because of the need to remove the solvent during the curing of the coating. Such removal leads to problems of pollution, ventilation, solvent recovery and other difficulties.

More desirable, if a solvent must be used, it is a material which itself is photopolymerizable. Typical of those solvents are trimethylolpropane triacrylate, pentaerythritol tetraacrylate and neopentylglycol diacrylate. Lower molecular weight acrylate esters may also be used but generally they are more volatile and can present similar difficulties to the nonpolymerizable solvents during baking. In general, however, any photopolymerizable solvent will react with the resinous composition of this invention when the system is subjected to actinic radiation.

The compositions are applied to the substratum by known coating techniques whether in a continuous coating or in separated indicia as in printing. The so coated substrate is then moved by conventional means into a zone where it is exposed to ultraviolet radiation. The duration of exposure to the actinic radiation is an amount to polymerize the reactive composition to a cured state. That amount of radiation will be known to those skilled in the art or may be easily determined by simple preliminary experiments.

The advantages and benefits of the compostions of the invention will be described in the following illustrative examples.

Example 1

To a resin kettle equipped with stirrer and thermometer were charged (500 grams) of the diglycidyl ether of bisphenol A, (115 grams) of a 36 carbon dimer acid sold as Empol 1022, (22 grams) of a 9 carbon saturated monoacid sold as Emfac 1202, (157 grams) of acrylic acid and 0.27 gram hydroquinone. The ingredients were in the equivalent ratio of one equivalent polyepoxide, 0.15 equivalent dimer acid, 0.05 equivalent saturated monoacid and 0.8 equivalent acrylic acid.

The temperature of the mixture was raised to 80° C at which point 0.26 gram triphenylphosphine and 1.08 grams of a 12.5 percent solution of chromium acetate in methanol were added. The temperature was gradually increased to a maximum of 115° C and maintained thereat for four hours. The percent acid and percent epoxide of the product were each below 0.5. The product was a liquid having a kinematic viscosity at 60° C of 5,235 centipoises.

A coating composition was prepared from 47.5 weight percent of the above product, 47.5 weight percent of 2-hydroxypropyl acrylate, 2.5 weight percent benzophenone and 2.5 weight percent of N,N-dimethylaniline. The composition was coated on Bonderite 37 steel. When tested for resistance to methyl ethyl ketone it gave a result of 50 double rubs before film failure. The coating required 5 passes at 100 feet per minute under a 200 watt per inch Hanovia medium pressure mercury vapor lamp. The cured coating had a reverse impact of 75 inch pounds.

A composition was prepared from 33 weight percent of the product of this example, 33 weight percent 2-acetoxypropyl acrylate and 33 weight percent titanium dioxide. Viscosities of the formulation were measured at 25° C in a Brookfield Viscometer at spindle speeds of 5 and 50 rpm. The ratio of the viscosity at 5 rpm to that at 50 rpm was taken as the thixotropy index. That index was 0.99.

Example 2

Several compositions were prepared from various ingredients in differing equivalent ratios according to the procedure of Example 1 and tested by the methods of that example. In some of the formulations the polyepoxide was the diglycidyl ether of bisphenol A (hereafter Epoxy A), in others it was an epoxy novolac (hereafter Epoxy B), and in others a polyglycol diepoxide (hereafter Epoxy C) having an epoxy equivalent weight of from 175 to 205.

The results are shown in the following Table.

Example 3

A resin was prepared from 1.7 equivalents of a 50 percent mixture of Epoxy A and Epoxy B, 0.15 equivalent Empol 1022, 0.05 equivalent pelargonic acid and 0.8 equivalent acrylic acid.

A printing ink was prepared from 48 weight percent of that resin, 20 weight percent pentaerythritol tetraacrylate, 30 weight percent DuPont R-900 titanium dioxide pigment and 2 weight percent of a 50/50 weight mixture of 2-chlorothioxanthane and methyldiethanol amine. The formulation was milled for 10 seconds on a three roll mill and then coated on paper. The ink cured in 4 passes under a 200 watt per inch Hanovia lamp to give a high gloss white ink.

In a similar manner inks were prepared using the composition of Example 1 and Sample 1 of Example 2. In each instance a high gloss white ink resulted from 4 passes under the mercury vapor lamp.

Example 4

The method of Example 1 was followed using a half ester prepared by reacting 47.7 g. of 2-hydroxyethyl acrylate with 108.9 g. of dodecnylsuccinic anhydride at 105° for three hours. The above half ester, 77 g. (0.1 eq.) of Empol 1022, 66 g. (0.15 eq.) of pelargonic acid, and 118 g. (0.6 eq.) of acrylic acid were reacted with 1.0 eq. of a diglycidyl ether of bisphenol A to give a resin with a kinematic viscosity at 60° C. of 3650 cks.

What is claimed is:

1. A radiation curable composition said composition consisting essentially of the reaction product of from 0.9 to about 1.05 equivalents of carboxylic acid ingredients for 1.0 equivalents of a polyepoxide wherein said carboxylic acid ingredients consist essentially of from 0.1 to 0.3 equivalent of a dicarboxylic acid having from 20 to about 36 carbon atoms, from 0.5 to 0.9 equivalent of an ethylenically unsaturated monocarboxylic acid, and from 0 to 0.3 equivalent of a saturated monocarboxylic acid.

2. The composition of claim 1 wherein said dicarboxylic acid is a dimerized fatty acid.

3. The composition of claim 1 wherein said dicarboxylic acid is a diacid which is the reaction product of acrylic with linoleic or linolenic acid.

4. The composition of claim 1 wherein said ethylenically unsaturated monocarboxylic acid is acrylic acid.

5. The composition of claim 1 wherein said ethylenic unsaturated monocarboxylic acid is the reaction product of a hydroxyalkyl acrylate and a cyclic anhydride.

6. The composition of claim 1 wherein said saturated monocarboxylic acid is pelargonic acid.

| | Ingredients (equivs) | | | | | | Viscosity* of neat Resin | MEK Resistance | Thixotropy Index | Reverse Impact | Passes to Cure |
|---|---|---|---|---|---|---|---|---|---|---|---|
| Sample | Epoxy A | Epoxy B | Epoxy C | Empol 1022 | Emfac 1202 | Acrylic Acid | | | | | |
| 1 | 1.0 | — | — | 0.10 | 0.10 | 0.80 | 3,473 | 35 | 0.97 | 75 | 4–5 |
| 2 | 1.0 | — | — | 0.15 | 0.15 | 0.70 | 4,399 | 30 | — | 95 | 5 |
| 3 | 1.0 | — | — | 0.10 | 0.15 | 0.75 | 3,090 | — | — | — | — |
| 4 | 0.48 | 0.52 | — | 0.20 | — | 0.80 | 5,039 | 40 | 0.96 | 80 | 4–5 |
| 5 | 0.48 | 0.52 | — | 0.15 | 0.05 | 0.80 | 3,935 | 30 | 1.0 | 70 | 5 |
| 6 | 0.50 | — | 0.50 | 0.10 | 0.10 | 0.80 | 419 | — | — | — | — |
| 7 | 0.50 | — | 0.50 | 0.30 | — | 0.70 | 1,492 | — | — | — | — |
| 8 | 0.10 | — | 0.90 | 0.30 | — | 0.70 | 368 | — | — | — | — |
| 9 | — | 1.0 | — | 0.10 | 0.10 | 0.80 | 1,936 | — | — | — | — |
| For Comparison | | | | | | | | | | | |
| 10 | 1.0 | — | — | 0.50 | — | 0.50 | 39,018 | 10 | — | 95 | 7–8 |
| 11 | 0.48 | 0.52 | — | 0.50 | — | 0.50 | 99,313 | 20 | 0.97 | 95 | 7–8 |

*Kinematic viscosity at 60° C

7. The composition of claim 1 wherein said polyepoxide is the diglycidyl ether of bisphenol A.

8. The composition of claim 1 wherein said polyepoxide is a polyglycol diepoxide.

9. The composition of claim 1 wherein said polyepoxide is an epoxy novolac.

10. The composition of claim 1 also containing a photosensitizer.

11. The composition of claim 1 also containing an addition polymerizable solvent.

12. The composition of claim 11 wherein said solvent is pentaerythritol tetraacrylate.

13. The composition of claim 11 wherein said solvent is present in an amount of up to 50 weight percent of the composition.

* * * * *